(12) United States Patent
Wursthorn

(10) Patent No.: US 12,497,821 B2
(45) Date of Patent: Dec. 16, 2025

(54) VEHICLE WITH AT LEAST ONE FLAP

(71) Applicant: Bayerische Motoren Werke Aktiengesellschaft, Munich (DE)

(72) Inventor: Thomas Wursthorn, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 48 days.

(21) Appl. No.: 18/735,478

(22) Filed: Jun. 6, 2024

(65) Prior Publication Data

US 2024/0426165 A1 Dec. 26, 2024

(30) Foreign Application Priority Data

Jun. 23, 2023 (DE) ...................... 10 2023 116 658.1

(51) Int. Cl.
*E05F 15/77* (2015.01)

(52) U.S. Cl.
CPC ........... *E05F 15/77* (2015.01); *E05Y 2400/30* (2013.01); *E05Y 2400/35* (2013.01);
(Continued)

(58) Field of Classification Search
CPC ...... E05F 15/76; E05F 15/77; E05Y 2400/30; E05Y 2400/35; E05Y 2400/40; E05Y 2400/44; E05Y 2400/54; E05Y 2900/50
See application file for complete search history.

(56) References Cited

U.S. PATENT DOCUMENTS 8,228,166 B2 * 7/2012 Eberhard .............. E05F 15/611
340/5.72
9,214,083 B2 * 12/2015 Lim ....................... G08C 17/02
(Continued)

FOREIGN PATENT DOCUMENTS

CN 115341824 A * 11/2022 .............. B60J 5/102
DE 10 2010 001 263 A1 7/2011
(Continued)

OTHER PUBLICATIONS

CN 115341824 A—machine translation (Year: 2022).*
(Continued)

*Primary Examiner* — Dino Kujundzic
(74) *Attorney, Agent, or Firm* — Crowell & Moring LLP

(57) ABSTRACT

A vehicle has at least one flap, at least one flap drive, which is configured to open and close the at least one flap by changing a value of a state parameter of the at least one flap. A control device is configured to control the at least one flap drive in order to open the at least one flap up to an adjustable value of the state parameter of the at least one flap and to close the at least one flap. A communication device is configured to communicate wirelessly with at least one external communication device, and to periodically determine a distance of the communication device from the at least one external communication device, if a communication connection is established between the communication device and the at least one external communication device. The control device is configured to set the adjustable value of the state parameter of the at least one flap to a predetermined value of the state parameter of the at least one flap during a period in which the control device periodically determines that the distance is less than a predetermined threshold distance.

12 Claims, 1 Drawing Sheet

(52) U.S. Cl.
CPC ....... *E05Y 2400/40* (2013.01); *E05Y 2400/44* (2013.01); *E05Y 2400/54* (2013.01); *E05Y 2900/50* (2013.01)

(56) References Cited

U.S. PATENT DOCUMENTS

| | | | | |
|---|---|---|---|---|
| 12,365,310 | B2* | 7/2025 | Hasegawa | G01S 5/0284 |
| 2013/0317706 | A1 | 11/2013 | Ishibashi et al. | |
| 2016/0057273 | A1* | 2/2016 | Bochen | H04L 67/125 455/420 |
| 2017/0105235 | A1* | 4/2017 | Simsek | H04W 4/40 |
| 2019/0323280 | A1* | 10/2019 | Ghannam | E05F 15/668 |
| 2020/0115951 | A1 | 4/2020 | Naserian et al. | |
| 2022/0259914 | A1* | 8/2022 | Tsukao | E05F 15/73 |
| 2024/0117664 | A1* | 4/2024 | Tanaka | E05F 15/43 |

FOREIGN PATENT DOCUMENTS

| | | |
|---|---|---|
| DE | 11 2012 000 799 B4 | 7/2015 |
| DE | 10 2015 214 793 A1 | 2/2017 |
| DE | 10 2016 004 205 A1 | 2/2017 |
| DE | 10 2018 124 930 A1 | 4/2020 |
| DE | 10 2019 115 067 A1 | 4/2020 |
| DE | 10 2020 130 097 A1 | 5/2022 |
| WO | WO-2016008429 A1 * | 1/2016 ............. E05F 15/77 |

OTHER PUBLICATIONS

German-language Search Report issued in German Application No. 10 2023 116 658.1 dated Feb. 5, 2024 with partial English translation (12 pages).

* cited by examiner

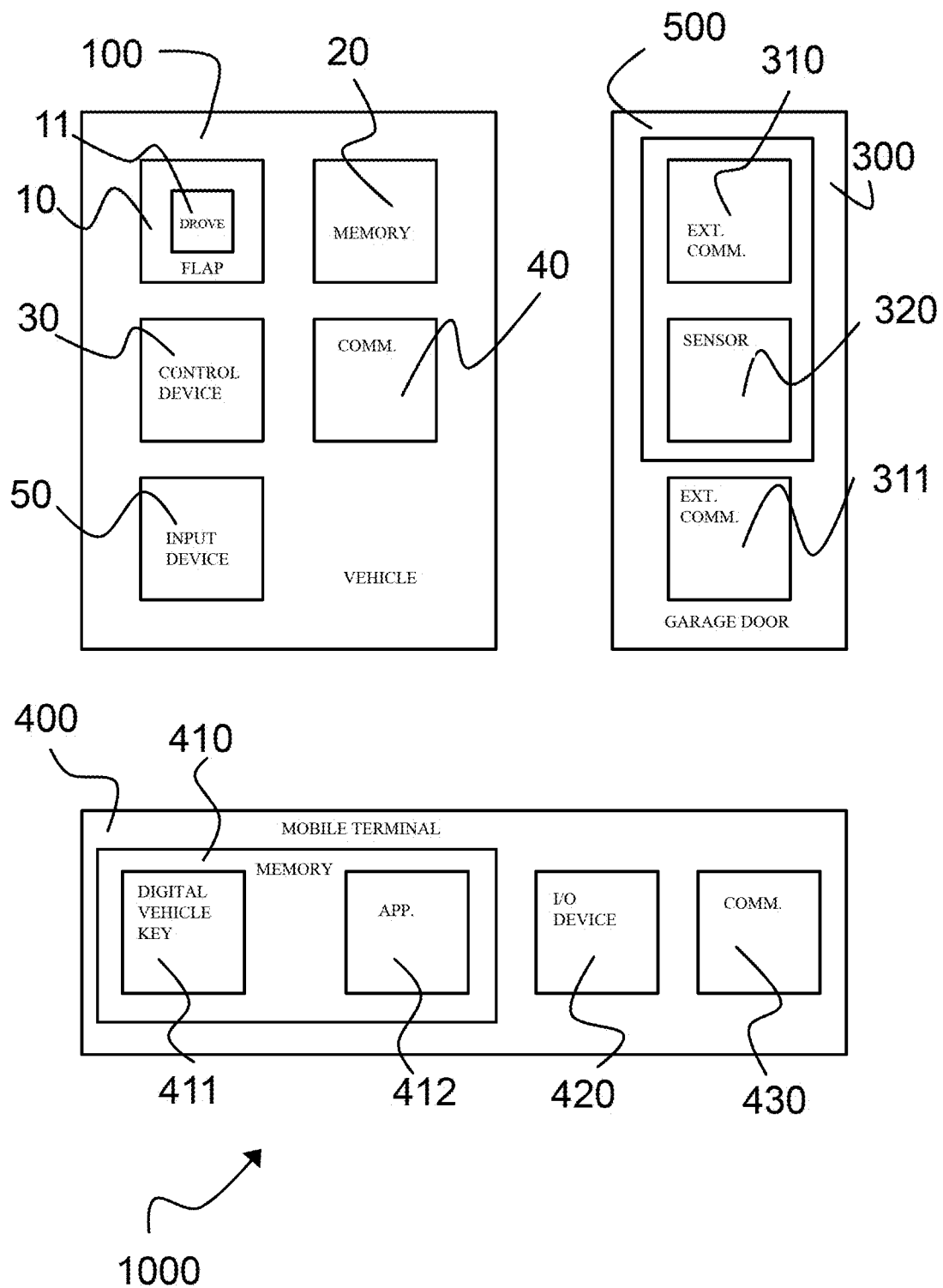

VEHICLE WITH AT LEAST ONE FLAP

CROSS REFERENCE TO RELATED APPLICATION

This application claims priority under 35 U.S.C. § 119 from German Patent Application No. DE 10 2023 116 658.1, filed Jun. 23, 2023, the entire disclosure of which is herein expressly incorporated by reference.

BACKGROUND AND SUMMARY

The present invention relates to a vehicle with at least one, in particular automated, flap, as well as a system that includes the vehicle and a mobile terminal.

In particular, the present invention relates to a vehicle in which a flap of the vehicle that can be driven by a drive, such as a vehicle door, a vehicle tailgate, a vehicle hood or a convertible top, can be opened and closed automatically in response to a specific action by a user, such as the user actuating a corresponding operating device or the user performing a certain movement, for example with the foot, which is detected by means of a sensor device.

For some of these automated flaps, the user may specify or set a maximum permissible opening angle or degree of opening of the flap for the automated opening process that is less than the maximum possible opening angle or degree of opening, i.e. a degree of opening of 100% of the flap.

However, even if the maximum permissible opening angle or maximum permissible degree of opening of the flap is set, it can happen that the flap hits an obstacle during the automated opening process and is damaged as a result.

It is an object of the present invention to reduce the risk of damage to a flap of a vehicle in the event of an automated opening of the flap.

This object is achieved by the features of the independent claims. Other preferred embodiments of the invention are the subject of the dependent claims.

According to a first aspect of the present invention, a vehicle has, according to one version, at least one flap, in some versions a vehicle door, preferably on a passenger side, and/or a vehicle tailgate and/or a vehicle hood and/or a convertible top. At least one flap drive is configured to open and close the at least one flap by changing a value of a state parameter of the at least one flap, wherein a respective value of the state parameter corresponds to a respective opening state, in some versions a respective percentage opening state, for example a respective degree of opening in a range from 0% to 100%, in some versions a respective opening angle within a range of 0° to a maximum opening angle that is assigned to the at least one flap. A control device is configured to control the at least one flap drive in order to open the at least one flap up to an adjustable value of the state parameter of the at least one flap, which in some versions is stored in a memory device of the vehicle, and to close the at least one flap. A communication device is configured to communicate wirelessly with at least one external communication device, in some versions by means of a short-range communication technique, and periodically to determine a distance of the communication device from the at least one external communication device when a communication connection is established between the communication device and the at least one external communication device. The control device is further configured to set the adjustable value of the state parameter of the at least one flap, in some versions temporarily, to a predetermined value of the state parameter of the at least one flap, which is stored in the memory device of the vehicle in some versions, during a period in which the control device periodically determines that the distance is less than a predetermined threshold distance.

In some versions, the distance of the communication device from at least one external communication device can be determined based on the communication between the communication device and the at least one external communication device.

For example, in one case, the distance of the communication device from the at least one external communication device may be calculated on the basis of a sum of, for example, transit times detected or measured by means of the control device of a signal emitted by the communication device to the at least one external communication device and of a signal emitted by the at least one external communication device to the communication device in response to the reception by the at least one external communication device of the signal emitted by the communication device.

Alternatively or additionally, the distance of the communication device from the at least one external communication device may be determined based on a signal strength detected or measured, for example, by means of the control device, of the signal transmitted by the at least one external communication device, in response to the reception by the at least one external communication device of the signal emitted by the communication device to the external communication device, and received by the communication device.

This can reduce the risk of damage to the at least one flap in some versions in which the at least one external communication device is located in a position in an area in which the opening movement of the at least one flap could be restricted by an object in the area. For example, the value for the threshold distance can be in a range of 1 m to 10 m.

"Temporary" in this context means that the adjustable value of the state parameter of the at least one flap is only set to the predetermined value of the state parameter of the at least one flap during the period in which the control device periodically determines that the distance is less than the predetermined threshold value distance.

If, on the other hand, no communication connection is established or exists between the communication device and the at least one external communication device, or if the control device determines that the distance is not less than the predetermined threshold distance, the previous value, i.e. the one set before the changeover to the predetermined value of the state parameter, is or is again set as the adjustable value of the state parameter of the at least one flap.

The term "vehicle" used here refers specifically to a passenger car, including all types of motor vehicles, hybrid and battery-powered electric vehicles, and vehicles such as sedans, vans, buses, trucks, light delivery trucks, and the like.

The term 'communication device' used here refers in particular to a wireless communication device. It can be a single unit or multiple units working together. In particular, a communication device may contain a control device, transmitter and receiver and at least one corresponding antenna. In a vehicle, a communication device may be distributed throughout the vehicle.

The terms "includes", "contains", "comprises", "has", "with", or any other variant thereof, if any, used here are intended to cover a non-exclusive incorporation. For example, a process or device that includes or has a list of elements is not necessarily limited to those elements, but may include other elements that are not expressly listed or that are inherent in such a process or device.

Further, unless expressly stated otherwise, "or" refers to an inclusive or rather than an exclusive "or". For example, a condition A or B is satisfied by one of the following conditions: A is true (or present) and B is false (or absent), A is false (or absent), and B is true (or present), and both A and B are true (or present).

The term "a" or "an" as used herein is defined in the sense of "one or more". The terms "another" and "a further" as well as any other variant thereof are to be understood in the sense of "at least one other".

The term 'plurality' or "multiple", as used here, is to be understood in the sense of 'two or more'.

For the purposes of the invention, the term "configured" or "set up" to perform a specific function (and respective variations thereof) is to be understood as meaning that the corresponding device already exists in a design or setting in which it can perform the function or at least it can be set up—i.e. is configurable—so that it can perform the function after the appropriate setting. The configuration can be carried out, for example, by suitably setting parameters of a process sequence or switches or similar to activate or deactivate functionalities or settings. In particular, the device may have several predetermined configurations or modes of operation, so that configuration can be carried out by means of a selection of one of these configurations or modes of operation.

In the following, preferred embodiments of the invention and the developments thereof are described, each of which, unless expressly excluded, can be combined with each other as desired.

In some versions, the respective opening states of the at least one flap can include a completely closed state of the at least one flap, a fully open state of the at least one flap, and a plurality of states, in some versions all states that can be adjusted by means of the drive and a corresponding mechanism, which the at least one flap passes through or adopts starting from the fully closed state to the fully opened state of the at least one flap.

In some versions, the vehicle may also have an input device that is set up to allow a user, using the input device, to set at least the predetermined value of the state parameter of the at least one flap and, optionally, the adjustable value of the state parameter of the at least one flap.

For example, the input device can be in the form of a touch screen and/or can be integrated into a control device of the vehicle for controlling other functions of the vehicle and/or may be a part of the same.

Furthermore, the control device can be set up to store a predetermined value of the state parameter of the at least one flap entered by a user using the input device and, optionally, an adjustable value of the state parameter of the at least one flap entered by a user using the input device, in the memory device of the vehicle.

In some versions, the input device may be set up to enable the user, using the input device, to set a respective adjustable value of the state parameter and a respective predetermined value of the state parameter for each flap of the one or more flaps.

Furthermore, the control device may be set up to store a respective adjustable value of the state parameter entered by a user using the input device for a particular flap of the at least one flap and a predetermined value of the state parameter entered by a user using the input device for a particular flap of the at least one flap in the memory device of the vehicle.

For example, if the state parameter is the percentage opening state, the user can set the predetermined value for a front passenger door flap to 50% and/or the predetermined value for a flap in the form of a tailgate to 70% in order to reduce the risk of damage to the front passenger door and/or the tailgate during the corresponding opening movement, for example when the vehicle is parked in a garage in which the at least one external communication device is installed.

In some versions, the short-range communication technology may include ultra-wideband technology and/or Bluetooth (registered trademark) technology, in particular Bluetooth Low Energy (BLE; registered trademark) technology, wherein the at least one external communication device can be in the form of an ultra-wideband anchor and/or of a Bluetooth anchor, in particular a Bluetooth Low Energy anchor.

The ultra-wideband technology (UWB) is a technology for short-range radio communications. For this purpose, a vehicle may be equipped with an appropriate communication device or, more generally, an "infrastructure" for communicating with other ultra-wideband-capable devices. For example, modern vehicles can be equipped with ultra-wideband for keyless entry. Ultra-wideband can be used to enable the unlocking and locking of vehicles. In particular, specifications can be CCC compliant.

In some versions, the at least one flap may have a convertible top, and the control device may be set up to prevent the performance of an opening and/or closing operation of the convertible top, in some versions temporarily, during the period during which the control device periodically determines that the distance is less than the predetermined threshold distance.

According to a second aspect of the present invention, a system has a vehicle described above, and a mobile terminal on which an application is stored, in some versions in a memory device thereof, wherein the mobile terminal, in some versions the application, is configured to allow the user, using the application, and in some versions an input and output device of the mobile terminal, to enter the predetermined value of the state parameter of the at least one flap for the at least one flap. The mobile terminal also has a communication device that is configured to communicate with the communication device wirelessly, in some cases by means of short-range communication technology, and to send to the communication device a predetermined value of the state parameter of the at least one flap entered by the user using the application. The control device is configured to set the adjustable value of the state parameter of the at least one flap to a predetermined value of the state parameter of the at least one flap entered by the user using the application, sent by the communication device and received via the communication device, during the period during which the control device periodically determines that the distance is less than the predetermined threshold distance.

As a result, in some versions, the predetermined value of the state parameter of the at least one flap can be easily set using the mobile terminal.

The term "mobile terminal" used here refers specifically to electronic devices that are portable and capable of communicating wirelessly with other devices or networks. They are handy devices that can often be carried in the pocket or held in the hand. Mobile terminals include smartphones, tablets, laptops, smartwatches, and other similar devices. These devices typically use cellular networks, WLAN, Bluetooth, or UWB to establish a wireless connection and enable data transfers.

In some versions, a digital vehicle key for the vehicle may be stored on the mobile terminal, in some versions in the memory device thereof. The communication device is set up to send the digital vehicle key to the communication device. The control device is set up to check whether or not the digital vehicle key received by means of the communication device is a digital vehicle key registered for the vehicle. The control device is set up to set the adjustable value of the state parameter of the at least one flap to the predetermined value of the state parameter of the at least one flap entered by the user using the application, sent by the communication device and received via the communication device, in the period in which the control device periodically determines that the distance is less than the predetermined threshold distance, only if the digital vehicle key received is a digital vehicle key registered for the vehicle.

As a result, in some versions, this prevents the adjustable value of the state parameter of the at least one flap from being set to a predetermined value of the state parameter of the at least one flap entered using a mobile terminal on which the digital vehicle key is not stored.

The term "digital vehicle key" used here refers in particular to an electronic medium that can be used to open or start a vehicle or to control other functions such as opening and/or closing the at least one flap. Unlike a traditional key, a digital vehicle key consists of digital information stored in an electronic device. A digital vehicle key can be implemented in a number of ways. One way is for the digital key to be stored in a mobile application on a smartphone. The smartphone then acts as the digital vehicle key and communicates wirelessly with the vehicle via a wireless, and in particular encrypted, connection to unlock the door, start the engine or at least open or close a flap. For example, the wireless connection can be made via Bluetooth, especially BLE (Bluetooth Low Energy), or UWB.

Here, the control device may check whether the digital vehicle key received via the communication device is a digital vehicle key registered for the vehicle on the basis of a database stored, for example, in the memory device of the vehicle, which contains one or more digital vehicle keys registered for the vehicle.

In some versions, the system may also have a garage door that is set up to allow access to a garage (for the vehicle) when in an open state and to prevent access to the garage when in a closed state, wherein the garage door has a first external communication device of the one or more external communication devices and a sensor that is set up to determine whether the garage door is in the open state or the closed state, and the first external communication device is set up to wirelessly send a message to the communication device based on the determination of the sensor with information about whether the garage door is in the open state or the closed state, wherein the control device is set up to set the adjustable value of the state parameter of the at least one flap to the predetermined value of the state parameter of the at least one flap during the period in which the control device periodically determines that the distance is less than the predetermined threshold distance when the communication device receives a message from the first external communication device with information that the garage door is in the open state.

As a result, in some versions, in which the garage or the ceiling thereof has a free height (when the garage door is closed) that is sufficient to prevent the flap from hitting the ceiling during an opening operation with the normally set value of the state parameter, this prevents the flap from opening only up to the predetermined value of the state parameter.

In this case, the at least one external communication device may have a second external communication device which is arranged in a position, in some versions within the garage, which is different from a position in which the first external communication device is arranged. The communication device is set up to periodically determine a first distance of the communication device from the first external communication device and a second distance of the communication device from the second external communication device when the communication connection is established between the communication device and the first external communication device and the second external communication device. The control device is set up to periodically determine whether the vehicle is inside the garage or not, based on the determined first distance and the determined second distance, and to set the adjustable value of the state parameter of the at least one flap, in some versions temporarily, to the predetermined value of the state parameter of the at least one flap during a period in which the control device periodically determines that the vehicle is inside the garage.

As a result of this, in some versions the accuracy of determining whether the vehicle is in the garage or not can be increased, so that in a state in which the vehicle is not in the garage, the door may be opened wider, making it easier to load or unload in the case of a tailgate, for example.

Other objects, advantages and novel features of the present invention will become apparent from the following detailed description of one or more preferred embodiments when considered in conjunction with the accompanying drawing.

BRIEF DESCRIPTION OF THE DRAWING

FIG. 1 is a schematic block diagram of a system according to an embodiment having a vehicle, a mobile device, and a garage door of a garage in accordance with an embodiment of the invention.

DETAILED DESCRIPTION OF THE DRAWING

FIG. 1 shows a system 1000, which has a vehicle 100, a mobile terminal 400 and a garage door 300 of a garage 500.

The vehicle 100 has at least one flap 10, such as one or more vehicle doors, including a vehicle door on a passenger side, a vehicle tailgate or a vehicle hood or, if the vehicle 100 is in the form of a convertible, a convertible top.

Furthermore, the vehicle 100 has at least one flap drive 11, which has, for example, a motor, a gearbox and a mechanical connection from the motor to the at least one flap 10. The at least one flap drive 11 is set up to open and close the at least one flap 10 by changing a value of a state parameter of the at least one flap 10. In this case, a respective value of the state parameter is assigned to a respective opening state, for example a respective percentage, i.e. stated in percent, opening state, or a respective opening angle of the at least one flap 10.

In a case in which the at least one flap 10 is completely closed, the percentage opening state is 0%, while the opening angle is 0°.

In a case in which the flap 10 is fully open, the percentage opening state is 100%, while the opening angle corresponds to a maximum opening angle, for example limited by an appropriate mechanism.

The vehicle is also equipped with a control device 30 which is set up to control the at least one flap drive 11 in order to open the at least one flap 10 up to an adjustable value of the state parameter of the at least one flap 10 stored in a memory device 20 of the vehicle 100 and to close the at least one flap 10.

In addition, the vehicle 100 has a communication device 40 which is set up to communicate with at least one external communication device 310, 311 wirelessly, using a short-range communication technology, and periodically to determine a distance of the communication device 40 from the at least one external communication device 310, 311 if there is a communication connection between the communication device 40 and the at least one external communication device 310, 311.

The control device 30 is set up to temporarily set the adjustable value of the state parameter of the at least one flap 10 to a predetermined value of the state parameter of the at least one flap 10 stored in the memory device 20 of the vehicle 100 during a period in which the control device 30 periodically determines that the distance is less than a predetermined threshold distance.

The respective opening states of the at least one flap 10 include the completely closed state of the at least one flap 10, the fully open state of the at least one flap 10 and a plurality of states (in particular all states that can be adjusted on the basis of the drive 11 and the corresponding mechanism) of the at least one flap 10, which the at least one flap 10 passes through or occupies during an opening movement of the at least one flap 10 starting from the fully closed state of the at least one flap 10 to the fully open state of the at least one flap 10.

The vehicle 100 also has an input device 50, for example in the form of a touch screen, which is integrated into and/or may be a part of a control device, which is not shown, of the vehicle 100 for the control of other functions of the vehicle 100. In this case, the input device 50 is set up to allow a user to set the predetermined value of the state parameter of the at least one flap 10 and the adjustable value of the state parameter of the at least one flap 10 using the input device 50. In particular, the control device 30 is set up to store a predetermined value of the state parameter of the at least one flap 10 entered by the user using the input device 50 and an adjustable value of the state parameter of the at least one flap 10 entered by the user using the input device 50 in the memory device 20 of the vehicle 100.

Here the input device 50 is set up to enable the user to set a respective adjustable value of the state parameter and a respective predetermined value of the state parameter for each flap 10 of the one or more flaps 10 using the input device 50.

Furthermore, the control device 30 is set up to store a respective adjustable value of the state parameter entered by a user using the input device 50 for a respective flap 10 of the one or more flaps 10 and a respective predetermined value of the state parameter entered by a user using the input device 50 for a respective flap 10 of the one or more flaps 10 in the memory device 20 of the vehicle 100.

In a case in which the at least one flap 10 has the convertible top, the control device 30 is set up to temporarily prevent the execution of an opening operation and/or a closing operation of the convertible top during the period in which the control device 30 periodically determines that the distance is less than the predetermined threshold distance.

On the mobile terminal 400, in particular in a memory device 410 thereof, an application 412 is stored that can be accessed by the user. Here the mobile terminal 400, in particular the application 412 thereon called up by the user, is set up to enable the user to enter the predetermined value of the state parameter of the at least one flap 10 using the application 412 and an input and output device 420, for example a touch screen, of the mobile terminal 400.

The mobile terminal 400 also has a communication device 430 which is set up to communicate wirelessly with the communication device 40 via the short-range communication technology and to send to the communication device 40 a predetermined value of the state parameter of the at least one flap 10 entered by the user using the application 412 (and the input and output device 420).

The control device 30 is set up to temporarily set the adjustable value of the state parameter of the at least one flap 10 to a predetermined value of the state parameter of the at least one flap 10 sent by the communication device 430 and received via the communication device 40 and entered by the user using the application 412 during the period in which the control device 30 periodically determines that the distance is less than the predetermined threshold distance.

In some versions, a digital vehicle key 411 for the vehicle 100 is stored on the mobile terminal 400, in particular in the memory device 410. In this case, the communication device 430 is set up to send the digital vehicle key 411 to the communication device 40.

Here the control device 30, is set up to check whether the digital vehicle key 411 received via the communication device 40 is a digital vehicle key registered for the vehicle 100 or not. This check can be carried out, for example, on the basis of a database stored in the memory device 20 of the vehicle 100, which contains one or more digital vehicle keys registered for the vehicle 100.

In addition, the control device 30 is set up to temporarily set the adjustable value of the state parameter of the at least one flap 10 to the predetermined value of the state parameter of the at least one flap 10 sent by the communication device 430 and received via the communication device 40 and entered by the user using the application 412 during the period in which the control device 30 periodically determines that the distance is less than the predetermined threshold distance, only if the received digital vehicle key 411 is a digital vehicle key registered for the vehicle.

The preferably automated garage door 300 is set up to allow access to the garage 500 (for the vehicle 100) when open and to prevent access to the garage 500 when closed. The garage door 300 has a first external communication device 310 of the one or more external communication devices 310, 311 and a sensor 320, which is set up to determine whether the garage door 300 is in the open state or the closed state. Here, the first external communication device 310 is set up to send a message wirelessly to the communication device 40 with information about whether the garage door 300 is in the open state or the closed state, based on the determination of the sensor 320.

In addition, the control device 30 is set up to set the adjustable value of the state parameter of the at least one flap 10 to the predetermined value of the state parameter of the at least one flap 10 during the period in which the control device 30 periodically determines that the distance is less than the predetermined threshold distance if the communication device 40 receives a message from the first external communication device 310 that the garage door 300 is in the open state.

In some versions, the one or more external communication devices 310, 311 have a second external communication device 311, which is arranged in a position, in some versions within the garage 500, which is different from a position in which the first external communication device 310 is arranged.

Here, the communication device 40 is set up to periodically determine a first distance of the communication device 40 from the first external communication device 310 and a second distance of the communication device 40 from the second external communication device 311 if the communication connection between the communication device 40 and the first external communication device 310 and the second external communication device 311 is established.

The control device 30 is set up to periodically determine whether the vehicle 100 is inside the garage 500 or not, based on the determined first distance and the determined second distance, and to temporarily set the adjustable value of the state parameter of the at least one flap 10 to the predetermined value of the state parameter of the at least one flap 10 during a period of time in which the control device 30 periodically determines that the vehicle 100 is inside the garage 500.

The short-range communication technology may include ultra-wideband technology and/or Bluetooth technology, in particular Bluetooth Low Energy (BLE) technology, and the at least one external communication device 310, 311 may be in the form of an ultra-wideband anchor and/or of a Bluetooth anchor, in particular a Bluetooth Low Energy (BLE) anchor.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle, comprising:
   at least one flap of the vehicle;
   at least one flap drive which is configured to open and close the at least one flap by changing a value of a state parameter of the at least one flap, wherein a respective value of the state parameter is associated with a respective opening state,
   a control device which is configured to control the at least one flap drive in order to open the at least one flap up to an adjustable value, which is stored in a memory of the vehicle, of the state parameter of the at least one flap and to close the at least one flap; and
   a communication device which is configured to communicate wirelessly with at least one external communication device and periodically to determine a distance of the communication device from the at least one external communication device when a communication connection is established between the communication device and the one or more external communication devices,
   wherein the control device is further configured to set the adjustable value of the state parameter of the at least one flap to a predetermined value of the state parameter of the at least one flap that is stored in the memory of the vehicle during a period in which the control device periodically determines that the distance is less than a predetermined threshold distance.

2. The vehicle according to claim 1, wherein
   the respective value is a respective percentage opening state that is associated with the at least one flap.

3. The vehicle according to claim 1, wherein
   the wireless communication is via a short-range communication technique.

4. The vehicle according to claim 3, wherein
   the short-range communication technology comprises an ultra-wideband technology, a Bluetooth technology, or a Bluetooth low-energy technology, and
   the at least one external communication device is in the form of an ultra-wideband anchor, a Bluetooth anchor, or a Bluetooth low-energy anchor.

5. The vehicle according to claim 1, wherein
   the respective opening states of the at least one flap have a completely closed state of the at least one flap, a fully open state of the at least one flap, and a plurality of states of the at least one flap which the at least one flap passes through during an opening movement of the at least one flap starting from the completely closed state of the at least one flap to the fully open state of the at least one flap.

6. The vehicle according to claim 1, further comprising:
   an input device which is configured to enable a user using the input device to set at least the predetermined value of the state parameter of the at least one flap, and, optionally, the adjustable value of the state parameter of the at least one flap.

7. The vehicle according to claim 6, wherein
   the input device is configured to enable the user using the input device to set a respective adjustable value of the state parameter and a respective predetermined value of the state parameter for each flap of one or more flaps.

8. The vehicle according to claim 1, wherein
   the at least one flap is a convertible top, and
   the control device is configured to prevent an opening and/or closing operation of the convertible top, temporarily, during the period in which the control device periodically determines that the distance is less than the predetermined threshold distance.

9. A system, comprising:
   a vehicle according to claim 1; and
   a mobile terminal on which an application is stored, wherein:
      the mobile terminal is configured to enable the user when using the application to enter the predetermined value of the state parameter of the at least one flap for the at least one flap, wherein:
      the mobile terminal also has a communication device which is configured to communicate with the communication device wirelessly and to send to the communication device a predetermined value of the state parameter of the at least one flap entered by the user using the application, and
   the control device is configured to set the adjustable value of the state parameter of the at least one flap to a predetermined value of the state parameter of the at least one flap sent by the communication device and received via the communication device and entered by the user using the application during the period in which the control device periodically determines that the distance is less than the predetermined threshold distance.

10. The system according to claim 9, wherein
    a digital vehicle key for the vehicle is stored on the mobile terminal,
    the communication device is configured to send the digital vehicle key to the communication device;
    the control device is configured to check whether or not the digital vehicle key received via the communication device is a digital vehicle key registered for the vehicle, and the control device is configured to set the adjustable value of the state parameter of the at least one flap to the predetermined value of the state parameter of the at least one flap sent by the communication device and received via the communication device and entered by the user using the application during the period in which the control device periodically determines that the distance is less than the predetermined threshold distance, only when the vehicle digital key received is a vehicle digital key registered for the vehicle.

11. The system according to claim 9, further comprising:
a garage door which is configured to allow access to a garage in an open state, and to prevent access to the garage in a closed state, wherein the garage door has a first external communication device of the one or more external communication devices and a sensor, which is configured to determine whether the garage door is in the open or closed state, the first external communication device is configured to send a message wirelessly to the communication device with information about whether the garage door is in the open or closed state, wherein
the control device is configured to set the adjustable value of the state parameter of the at least one flap to the predetermined value of the state parameter of the at least one flap during the period in which the control device periodically determines that the distance is less than the predetermined threshold distance when the communication device receives a message from the first external communication device with information that the garage door is in the open state.

12. The system according to claim 11, wherein
the at least one external communication device includes a second external communication device which is arranged at a position, within the garage, which differs from a position at which the first external communication device is arranged,
the communication device is configured to periodically determine a first distance of the communication device from the first external communication device and a second distance of the communication device from the second external communication device when the communication connection is established between the communication device and the first external communication device and the second external communication device,
the control device is configured to:
periodically determine whether or not the vehicle is inside the garage based on the determined first distance and the determined second distance, and
set the adjustable value of the state parameter of the at least one flap, temporarily, to the predetermined value of the state parameter of the at least one flap during a period in which the control device periodically determines that the vehicle is inside the garage.

* * * * *